(12) United States Patent
Deeb et al.

(10) Patent No.: US 11,496,490 B2
(45) Date of Patent: Nov. 8, 2022

(54) NOTIFICATION OF A SECURITY BREACH ON A MOBILE DEVICE

(71) Applicant: Bottomline Technologies (de) Inc., Portsmouth, NH (US)

(72) Inventors: Alexander Deeb, Portsmouth, NH (US); Durga Nagalla, Woburn, MA (US)

(73) Assignee: Bottomline Technologies, Inc., Portsmouth, NH (US)

( * ) Notice: Subject to any disclaimer, the term of this patent is extended or adjusted under 35 U.S.C. 154(b) by 937 days.

(21) Appl. No.: 16/388,242

(22) PCT Filed: Dec. 2, 2016

(86) PCT No.: PCT/US2016/064689
§ 371 (c)(1),
(2) Date: Apr. 18, 2019

(87) PCT Pub. No.: WO2017/096206
PCT Pub. Date: Jun. 8, 2017

(65) Prior Publication Data
US 2019/0373001 A1 Dec. 5, 2019

Related U.S. Application Data

(63) Continuation of application No. 14/959,492, filed on Dec. 4, 2015, now abandoned.

(51) Int. Cl.
*H04L 9/40* (2022.01)
*H04W 12/02* (2009.01)
(Continued)

(52) U.S. Cl.
CPC .......... *H04L 63/1416* (2013.01); *H04L 63/10* (2013.01); *H04L 63/1441* (2013.01);
(Continued)

(58) Field of Classification Search
CPC .. G06F 21/554; G06F 21/566; G06F 21/6245; G06F 21/88; H04L 63/10;
(Continued)

(56) References Cited

U.S. PATENT DOCUMENTS

| 4,575,793 A | 3/1986 | Morel et al. |
| 5,228,122 A | 7/1993 | Cahn et al. |

(Continued)

FOREIGN PATENT DOCUMENTS

| CN | 102004878 A | 4/2011 |
| CN | 104077539 A | 10/2014 |

(Continued)

OTHER PUBLICATIONS

International Search Report for corresponding International Application No. PCT/US2016/064689, dated Feb. 22, 2017.
(Continued)

*Primary Examiner* — Daniel B Potratz
*Assistant Examiner* — Matthias Habtegeorgis
(74) *Attorney, Agent, or Firm* — Richard A. Baker, Jr.

(57) ABSTRACT

A method and device for providing notification of improper access to secure data on a mobile device. The mobile device detects a request to record content displayed on a display of the mobile device. A determination is then made regarding whether the content that was displayed on the screen when the request to record was received is protected content. If the displayed content was protected, then a third party is notified that a security breach has been detected. A remedial action is also performed regarding the security breach.

14 Claims, 3 Drawing Sheets

(51) Int. Cl.
  *H04M 1/67* (2006.01)
  *H04W 12/12* (2021.01)
  *H04W 12/37* (2021.01)
  *G06F 21/55* (2013.01)
  *G06F 21/88* (2013.01)
  *G06F 21/56* (2013.01)
  *G06F 21/62* (2013.01)

(52) U.S. Cl.
  CPC ............. *H04M 1/67* (2013.01); *H04W 12/02* (2013.01); *H04W 12/12* (2013.01); *H04W 12/37* (2021.01); *G06F 21/554* (2013.01); *G06F 21/566* (2013.01); *G06F 21/6245* (2013.01); *G06F 21/88* (2013.01)

(58) Field of Classification Search
  CPC .. H04L 63/1416; H04L 63/1441; H04M 1/67; H04W 12/02; H04W 12/12; H04W 12/37
  See application file for complete search history.

(56) References Cited

U.S. PATENT DOCUMENTS

| | | |
|---|---|---|
| 5,559,961 A | 9/1996 | Blonder |
| 5,600,735 A | 2/1997 | Seybold |
| 5,600,835 A | 2/1997 | Garland et al. |
| 5,634,008 A | 5/1997 | Gaffaney et al. |
| 5,644,717 A | 7/1997 | Clark |
| 5,790,798 A | 8/1998 | Beckett et al. |
| 5,845,369 A | 12/1998 | Dunchock |
| 5,912,669 A | 6/1999 | Hsia |
| 5,961,592 A | 10/1999 | Hsia |
| 5,970,482 A | 10/1999 | Pham et al. |
| 6,044,401 A | 3/2000 | Harvey |
| 6,192,411 B1 | 2/2001 | Chan et al. |
| 6,205,416 B1 | 3/2001 | Butts et al. |
| 6,256,737 B1 | 7/2001 | Bianco et al. |
| 6,523,016 B1 | 2/2003 | Michalski |
| 6,651,099 B1 | 11/2003 | Dietz et al. |
| 6,675,164 B2 | 1/2004 | Kamath et al. |
| 6,687,693 B2 | 2/2004 | Cereghini et al. |
| 6,708,163 B1 | 3/2004 | Kargupta et al. |
| 6,801,190 B1 | 10/2004 | Robinson et al. |
| 6,845,369 B1 | 1/2005 | Rodenburg |
| 7,092,941 B1 | 8/2006 | Campos |
| 7,174,462 B2 | 2/2007 | Pering et al. |
| 7,308,436 B2 | 12/2007 | Bala et al. |
| 7,415,509 B1 | 8/2008 | Kaltenmark et al. |
| 7,730,521 B1 | 6/2010 | Thesayi et al. |
| 7,822,598 B2 | 10/2010 | Carus et al. |
| 7,831,703 B2 | 11/2010 | Krelbaum et al. |
| 7,860,783 B2 | 12/2010 | Yang et al. |
| 7,992,202 B2 | 8/2011 | Won et al. |
| 8,229,875 B2 | 7/2012 | Roychowdhury |
| 8,229,876 B2 | 7/2012 | Roychowdhury |
| 8,392,975 B1 | 3/2013 | Raghunath |
| 8,429,745 B1 | 4/2013 | Casaburi et al. |
| 8,433,791 B2 | 4/2013 | Krelbaum et al. |
| 8,515,862 B2 | 8/2013 | Zhang et al. |
| 8,638,939 B1 | 1/2014 | Casey et al. |
| 8,650,624 B2 | 2/2014 | Griffin et al. |
| 8,776,213 B2 | 7/2014 | McLaughlin et al. |
| 8,844,059 B1 | 9/2014 | Manmohan |
| 8,881,005 B2 | 11/2014 | Al et al. |
| 9,015,036 B2 | 4/2015 | Karov et al. |
| 9,489,627 B2 | 11/2016 | Bala |
| 9,529,678 B2 | 12/2016 | Krelbaum et al. |
| 9,537,848 B2 | 1/2017 | McLaughlin et al. |
| 9,607,103 B2 | 3/2017 | Anderson |
| 9,667,609 B2 | 5/2017 | McLaughlin et al. |
| 9,684,804 B2* | 6/2017 | Cohen ..................... H04N 7/18 |
| 9,691,085 B2 | 6/2017 | Scheidelman |
| 10,037,533 B2 | 7/2018 | Caldera |
| 10,045,092 B2* | 8/2018 | Deuel ............. H04N 21/44008 |
| 10,152,680 B1 | 12/2018 | Myrick et al. |
| 10,235,356 B2 | 3/2019 | Amend et al. |
| 10,242,258 B2 | 3/2019 | Guo et al. |
| 10,320,800 B2 | 6/2019 | Guo et al. |
| 10,402,817 B1 | 9/2019 | Benkreira et al. |
| 10,414,197 B2 | 9/2019 | Jesurum |
| 10,440,015 B1 | 10/2019 | Pham et al. |
| 10,467,631 B2 | 11/2019 | Dhurandhar et al. |
| 10,510,083 B1 | 12/2019 | Vukich et al. |
| 10,511,605 B2 | 12/2019 | Ramberg et al. |
| 10,523,681 B1 | 12/2019 | Bulgakov et al. |
| 10,552,837 B2 | 2/2020 | Jia et al. |
| 10,552,841 B1 | 2/2020 | Dixit |
| 10,607,008 B2 | 3/2020 | Byrne et al. |
| 10,607,228 B1 | 3/2020 | Gai et al. |
| 10,621,587 B2 | 4/2020 | Binns et al. |
| 10,699,075 B2 | 6/2020 | Amend et al. |
| 10,824,809 B2 | 11/2020 | Kutsch et al. |
| 11,042,555 B1 | 6/2021 | Kane et al. |
| 2002/0019945 A1 | 2/2002 | Houston et al. |
| 2002/0056043 A1 | 5/2002 | Glass |
| 2002/0065938 A1 | 5/2002 | Jungck et al. |
| 2002/0080123 A1 | 6/2002 | Kennedy et al. |
| 2002/0099649 A1 | 7/2002 | Lee et al. |
| 2002/0163934 A1 | 11/2002 | Moore et al. |
| 2002/0194159 A1 | 12/2002 | Kamath et al. |
| 2003/0041042 A1 | 2/2003 | Cohen et al. |
| 2003/0083764 A1 | 5/2003 | Hong |
| 2003/0110394 A1 | 6/2003 | Sharp et al. |
| 2003/0135612 A1 | 7/2003 | Huntington et al. |
| 2003/0233305 A1 | 12/2003 | Solomon |
| 2004/0034666 A1 | 2/2004 | Chen |
| 2004/0186882 A1 | 9/2004 | Ting |
| 2004/0193512 A1 | 9/2004 | Gobin et al. |
| 2005/0021650 A1 | 1/2005 | Gusler et al. |
| 2005/0081158 A1 | 4/2005 | Hwang |
| 2005/0154692 A1 | 7/2005 | Jacobsen et al. |
| 2005/0177483 A1 | 8/2005 | Napier et al. |
| 2006/0101048 A1 | 5/2006 | Mazzagatti et al. |
| 2006/0155751 A1 | 7/2006 | Geshwind et al. |
| 2006/0190310 A1 | 8/2006 | Gudla et al. |
| 2006/0212270 A1 | 9/2006 | Shiu et al. |
| 2007/0277224 A1 | 11/2007 | Osborn et al. |
| 2008/0104007 A1 | 5/2008 | Bala |
| 2009/0059793 A1 | 3/2009 | Greenberg |
| 2009/0094677 A1 | 4/2009 | Pietraszek et al. |
| 2009/0140838 A1 | 6/2009 | Newman et al. |
| 2009/0174667 A1 | 7/2009 | Kocienda et al. |
| 2009/0201257 A1 | 8/2009 | Saitoh et al. |
| 2009/0202153 A1 | 8/2009 | Cortopassi et al. |
| 2009/0307176 A1 | 12/2009 | Jeong et al. |
| 2009/0313693 A1 | 12/2009 | Rogers |
| 2010/0066540 A1 | 3/2010 | Theobald et al. |
| 2010/0130181 A1 | 5/2010 | Won |
| 2010/0153548 A1* | 6/2010 | Wang ..................... G07G 1/00 709/224 |
| 2010/0169958 A1 | 7/2010 | Werner et al. |
| 2010/0225443 A1 | 9/2010 | Bayram et al. |
| 2011/0055907 A1 | 3/2011 | Narasimhan et al. |
| 2011/0070864 A1 | 3/2011 | Karam et al. |
| 2011/0082911 A1 | 4/2011 | Agnoni et al. |
| 2011/0145587 A1 | 6/2011 | Park |
| 2011/0251951 A1 | 10/2011 | Kolkowitz et al. |
| 2011/0298753 A1 | 12/2011 | Chuang et al. |
| 2012/0041683 A1 | 2/2012 | Vaske et al. |
| 2012/0124662 A1 | 5/2012 | Baca et al. |
| 2012/0127102 A1 | 5/2012 | Uenohara et al. |
| 2012/0151553 A1 | 6/2012 | Burgess et al. |
| 2013/0071816 A1 | 3/2013 | Singh et al. |
| 2013/0117246 A1 | 5/2013 | Cabaniols et al. |
| 2013/0231974 A1 | 9/2013 | Harris et al. |
| 2013/0339141 A1 | 12/2013 | Stibel et al. |
| 2014/0006347 A1 | 1/2014 | Qureshi et al. |
| 2014/0053238 A1* | 2/2014 | Brannon ................. G06F 21/45 726/4 |
| 2014/0067656 A1 | 3/2014 | Cohen et al. |
| 2014/0149130 A1 | 5/2014 | Getchius |
| 2014/0196159 A1* | 7/2014 | Mangalam-Palli ..... G06F 21/85 726/30 |

(56) References Cited

U.S. PATENT DOCUMENTS

| | | | | |
|---|---|---|---|---|
| 2014/0215356 | A1* | 7/2014 | Brander | G06F 21/84 715/753 |
| 2014/0366159 | A1 | 12/2014 | Cohen | |
| 2015/0039473 | A1 | 2/2015 | Hu et al. | |
| 2015/0220509 | A1 | 8/2015 | Karov Zangvil et al. | |
| 2015/0220707 | A1* | 8/2015 | Kline | G06F 21/84 726/30 |
| 2015/0264573 | A1 | 9/2015 | Giordano et al. | |
| 2015/0348041 | A1 | 12/2015 | Campbell et al. | |
| 2016/0041984 | A1 | 2/2016 | Kaneda et al. | |
| 2016/0352759 | A1 | 12/2016 | Zhai | |
| 2017/0039219 | A1 | 2/2017 | Acharya et al. | |
| 2017/0154382 | A1 | 6/2017 | McLaughlin et al. | |
| 2017/0163664 | A1 | 6/2017 | Nagalla et al. | |
| 2017/0177743 | A1 | 6/2017 | Bhattacharjee et al. | |
| 2017/0300911 | A1 | 10/2017 | Alnajem | |
| 2018/0107944 | A1 | 4/2018 | Lin et al. | |
| 2018/0349924 | A1 | 12/2018 | Shah et al. | |
| 2019/0197189 | A1 | 6/2019 | Studnicka | |
| 2019/0228411 | A1 | 7/2019 | Hernandez-Ellsworth et al. | |
| 2019/0347281 | A1 | 11/2019 | Natterer | |
| 2019/0349371 | A1 | 11/2019 | Smith et al. | |
| 2020/0019964 | A1 | 1/2020 | Miller et al. | |
| 2020/0117800 | A1 | 4/2020 | Ramberg et al. | |
| 2021/0049326 | A1 | 2/2021 | Amend et al. | |

FOREIGN PATENT DOCUMENTS

| | | |
|---|---|---|
| CN | 104408376 A | 3/2015 |
| EP | 1211865 A2 | 6/2002 |
| EP | 1706960 A1 | 10/2006 |
| EP | 2653982 A1 | 10/2013 |
| EP | 2636149 A4 | 10/2016 |
| IL | 176551 A | 9/2012 |
| IN | 219405 | 3/2007 |
| KR | 10-0723738 B1 | 5/2007 |
| TW | 201723907 A | 7/2017 |
| WO | 01/25914 A2 | 4/2001 |
| WO | 02/87124 A1 | 10/2002 |
| WO | 2002/100039 A2 | 12/2002 |
| WO | 03/73724 A2 | 9/2003 |
| WO | 2005/067209 A1 | 7/2005 |
| WO | 2012/061701 A1 | 5/2012 |
| WO | 2014/145395 A2 | 9/2014 |
| WO | 2017/096206 A1 | 6/2017 |
| WO | 2017/209799 A1 | 12/2017 |

OTHER PUBLICATIONS

Appaloosa Store, "String Similarity Algorithms Compared", Apr. 5, 2018, webpage downloaded on Oct. 20, 2020 from https://medium.com/@appaloosastore/string-similarity-algorithms-compared-3f7b4d12f0ff.

Banon, Shay, "Geo Location and Search", elastic blog post, Aug. 16, 2010, webpage found at https://www.elastic.co/blog/geo-location-and-search on Oct. 15, 2019.

Bansal, Nikhil, Avrim Blum, and Shuchi Chawla. "Correlation clustering." Machine Learning 56.1-3 (2004): 89-113.

Bottomline Technologies, Bottomline Cyber Fraud & Risk Management:Secure Payments, marketing brochure.

Brasetvik, Alex, "Elasticsearch from the Bottom up, Part 1", Elastic, Sep. 16, 2013. Webpage found at https://www.elastic.co/blog/found-elasticsearch-from-the-bottom-up on Jun. 17, 2019.

Co-pending U.S. Appl. No. 13/135,507, filed Jul. 7, 2011.

Dalit Amitai, Shahar Cohen, Yulia Mayer, and Avital Seraty, "Fraud Detection Rule Optimization", U.S. Appl. No. 16/985,773, filed Aug. 5, 2020.

Experian, "Fuzzy address searching", webpage downloaded from https://www.edq.com/glossary/fuzzy-address-searching/ on Oct. 8, 2019.

Fenz, Dustin, et al., "Efficient Similarity Search in Very Large String Sets", conference paper, Jun. 2012.

Finley, Thomas, and Thorsten Joachims. "Supervised clustering with support vector machines." Proceedings of the 22nd international conference on Machine learning, ACM, 2005.

G. Kou, Y. Peng, Y. Shi, M. Wise, W. Xu, Discovering credit cardholders behavior by multiple criteria linear programming, Annals of Operations Research 135, (2005) 261-274.

Haydn Shaughnessy, Solving the $190 billion Annual Fraud Problem: More on Jumio, Forbes, Mar. 24, 2011.

IdentityMing, Accelerated Fintech Compliance and Powerful Online Fraud Prevention Tools, website found at https://identitymindglobal.com/momentum/ on Dec. 12, 2018.

International Search Report and Written Opinion received for PCT Patent Application No. PCT/IL05/000027, dated Jun. 2, 2005, 8 pages.

International Search Report and Written Opinion received for PCT Patent Application No. PCT/US17/13148, dated May 19, 2017, 11 pages.

Jeremy Olshan, How my bank tracked me to catch a thief, MarketWatch, Apr. 18, 2015.

Meia et al., Comparing clusterings-an information based distance, Journal of Multivariate Analysis 98 (2007) 873-895.

Mitchell, Stuart, et al., "pulp Documentation", Release 1.4.6, Jan. 27, 2010.

Postel et al.; "Telnet Protocol Specification" RFC 854; entered into the case on Apr. 18, 2013.

RodOn, "location extraction with fuzzy matching capabilities", Blog post on StackOverflow.com, Jul. 8, 2014, webpage downloaded from https://stackoverflow.com/questions/24622693/location-extraction-with-fuzzy-matching-capabilities on Oct. 8, 2019.

Rosette Text Analytics, "An Overview of Fuzzy Name Matching Techniques", Blog, Dec. 12, 2017, webpage downloaded from https://www.rosette.com/blog/overview-fuzzy-name-matching-techniques/ on Oct. 15, 2019.

Samaneh Soroumejad, Zahra Zojaji, Reza Ebrahimi Atani, Amir Hassan Monadjemi, "A Survey of Credit Card Fraud Detection Techniques: Data and Technique Oriented Perspective", 2016.

Schulz, Klaus and Stoyan Mihov, "Fast String Correction with Levenshtein-Automata", IJDAR (2002) 5: 67. https://doi.org/10.1007/s10032-002-0082-8.

The Telnet Protocol Microsoft Knowledgebase; entered into the case on Apr. 18, 2013.

Vogler, Raffael, "Comparison of String Distance Algorithms", Aug. 21, 2013, webpage downloaded on Oct. 20, 2020 from https://www.joyofdata.de/blog/comparison-of-string-distance-algorithms.

Wikil Kwak, Yong Shi, John J. Cheh, and Heeseok Lee, "Multiple Criteria Linear Programming Data Mining Approach: An Application for Bankruptcy Prediction", : Data Mining and Knowledge Management, Chinese Academy of Sciences Symposium, 2004, LNAI 3327, pp. 164-173, 2004.

Wikipedia, "Autoencoder", web page downloaded from http://en.wikipedia.org/wiki/Autoencoder on Dec. 18, 2020.

Wikipedia, "Damerau-Levenshtein distance", webpage downloaded on Oct. 20, 2020 from https://en.wikipedia.org/wiki/Damerau-Levenshtein_distance.

Written Opinion of the International Searching authority for corresponding International Application No. PCT/US2016/064689 dated Feb. 22, 2017.

* cited by examiner

NOTIFICATION OF A SECURITY BREACH ON A MOBILE DEVICE

PRIOR APPLICATION

The present inventions are a Continuation of pending PCT application number PCT/US16/64689, Method to Secure Protected Content on a Mobile Device, filed on Dec. 2, 2016, now WO/2017/096206. WO/2017/096206 is a PCT application that claims priority to U.S. patent application Ser. No. 14/959,492, Method to Secure Protected Content on a Mobile Device, filed on Dec. 4, 2015, now abandoned. Both applications incorporated herein by reference.

BACKGROUND

Technical Field

The present inventions relate to data security and, more particularly, to a method and system for providing notification of a security breach on a mobile device.

Background of the Invention

Mobile devices are frequently being used to access sensitive and protected data. For example, healthcare professionals are able to receive the results of medical tests, view diagnostic images, and review patient records using mobile devices. As the amount of electronic data has dramatically increased over the past decade, so have the number of data breaches, resulting in billions of private records being stolen. For this reason, much research has gone into improved methods of securing data.

Current methods for protecting data generally utilize sophisticated encryption schemes and/or multi-factor authentication in order to ensure that only authorized users gain access to the data. These current methods "trigger" on "who" is accessing the data and the current methods are typically constructed and deployed as "layers" of security starting potentially as true physical layers at the perimeter and culminating as encrypt/decrypt schemes.

SUMMARY OF THE INVENTION

The methods for protecting data described above do not adequately protect user data. For example, the above security measures do nothing to prevent a user that has the correct access credentials from copying and transferring protected data.

This problem is particularly prevalent in mobile devices where a user (authorized or otherwise) can simply perform a screen capture of the protected data. At this point, the user is free to transfer the screen capture of the protected data. This is a problem unique to mobile devices in that the devices are frequently taken into public and are capable of accessing sensitive data. In this way, if a user leaves their phone unlocked in public, a third party can pick up the phone and take a screen capture of the data. The screen capture can be transferred from the phone without the user ever being aware. Mobile devices, unlike personal computers and physical paperwork, are taken frequently into public places and are more likely to be left unattended on a table, in a bag, etc. than a print out of sensitive data or a computer would be.

The present disclosure provides a method for securing data by detecting a request to record content, determining whether the content to be recorded is protected, notifying a third party that a security breach has been detected, and performing a remedial action.

According to one aspect of the disclosure, there is provided a mobile device configured to prevent electronic data from being compromised. The mobile device includes: a non-transitory computer readable memory, a network interface, a display configured to display protected content and non-protected content, and a processor. The processor is configured to access protected content and detect a security breach. The processor detects a security breach by: receiving a request to record content currently displayed on the display; detecting the content displayed on the display when the request to record currently displayed content was received; and determining that the content displayed on the display when the request was received is the protected content. If a security breach is detected, the processor notifies a third party via the network interface that the security breach occurred and performs a remedial action.

Alternatively or additionally, the content is determined to be protected content if an application executed by the processor and generating the content being displayed is flagged as a protected application.

Alternatively or additionally, the processor is configured to determine that the content displayed on the display when the request was received is the protected content by: notifying an application generating the content being displayed that the request to record content was received and receiving from the application an indication that the content being displayed is the protected content.

Alternatively or additionally, the notification that the security breach occurred includes information identifying at least one of the mobile device or a user of the mobile device.

Alternatively or additionally, the identifying information includes at least one of a username, a geo-location of the device, a device identifier, or an image captured by a camera of the mobile device after the request to record was received.

Alternatively or additionally, the notification to the third party includes multiple notifications sent to different network locations.

Alternatively or additionally, the notification that the security breach occurred includes a record of the content displayed on the display when the request was received.

Alternatively or additionally, the remedial action includes at least one of deleting data stored on the mobile device, capturing an image of a user of the mobile device when the request to capture a screen shot was received, disabling the mobile device, or disabling login credentials used to access the protected content.

Alternatively or additionally, the processor performs the remedial action after receiving a request via the network interface to perform the remedial action.

According to another aspect of the disclosure, there is provided a method to prevent data viewed on a mobile device from being compromised. The method includes receiving a request to record content currently displayed on a display of the mobile device and detecting the content displayed on the display when the request to record currently displayed content was received. The method also includes determining if the content displayed on the display when the request was received is the protected content. If the content displayed when the request was received is the protected content: the method notifies a third party via a network interface of the mobile device that the security breach occurred and performs a remedial action.

Alternatively or additionally, the content is determined to be protected content if an application generating the content being displayed is flagged as a protected application.

Alternatively or additionally, the content displayed on the display when the request was received is determined to be the protected content by: notifying an application generating the content being displayed that the request to record content was received and receiving from the application an indication that the content being displayed is the protected content.

Alternatively or additionally, the notification that the security breach occurred includes information identifying at least one of the mobile device or a user of the mobile device.

Alternatively or additionally, the identifying information includes at least one of a username, a geo-location of the device, a device identifier, or an image captured by a camera of the mobile device after the request to record was received.

Alternatively or additionally, the notification that the security breach occurred includes a record of the content displayed on the display when the request was received.

Alternatively or additionally, the remedial action includes at least one of deleting data stored on the mobile device, capturing an image of a user of the mobile device when the request to capture a screen shot was received, disabling the mobile device, or disabling login credentials used to access the protected content.

Alternatively or additionally, the remedial action is performed after receiving a request to perform the remedial action.

According to a further aspect of the disclosure, there is provided a system configured to prevent data viewed on a mobile device from being compromised. The system includes a mobile device including: a non-transitory computer readable memory, a network interface, and a display. The mobile device also includes a processor configured to access protected content and detect a security breach by: receiving a request to record content currently displayed on the display, detecting the content displayed on the display when the request to record currently displayed content was received; and determining that the content displayed on the display when the request was received is the protected content. If a security breach is detected, the processor sends a notification to a third party computer via the network interface. The notification indicates that the security breach occurred. The system also includes a third party computer. The third party computer includes a communication interface configured to communicate with the network interface of the mobile device and receive the notification from the mobile device and a processor. The processor of the third party computer is configured to: receive the notification from the communication interface, determine the nature of the protected content displayed on the display when the request was received, based on the nature of the protected content and the user of the mobile device, determine a remedial action to perform, and send an indication of the remedial action to perform to the mobile device. The notification includes information regarding the protected content displayed on the display when the request was received and a user of the mobile device. The processor of the mobile device is further configured to perform the remedial action indicated by the third party computer.

A number of features are described herein with respect to embodiments of this disclosure. Features described with respect to a given embodiment also may be employed in connection with other embodiments.

For a better understanding of the present disclosure, together with other and further aspects thereof, reference is made to the following description, taken in conjunction with the accompanying drawings. The scope of the disclosure is set forth in the appended claims, which set forth in detail certain illustrative embodiments. These embodiments are indicative, however, of but a few of the various ways in which the principles of the disclosure may be employed.

DETAILED DESCRIPTION OF THE INVENTIONS

The present inventions are now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

The present disclosure provides a method and device for securing data accessed by a mobile device. The mobile device detects a request to record content displayed on a display of the mobile device. A determination is then made regarding whether the content that was displayed on the screen when the request to record was received is protected content. If the displayed content was protected, then a third party is notified that a security breach has been detected. A remedial action is also performed regarding the security breach.

Figure 1:
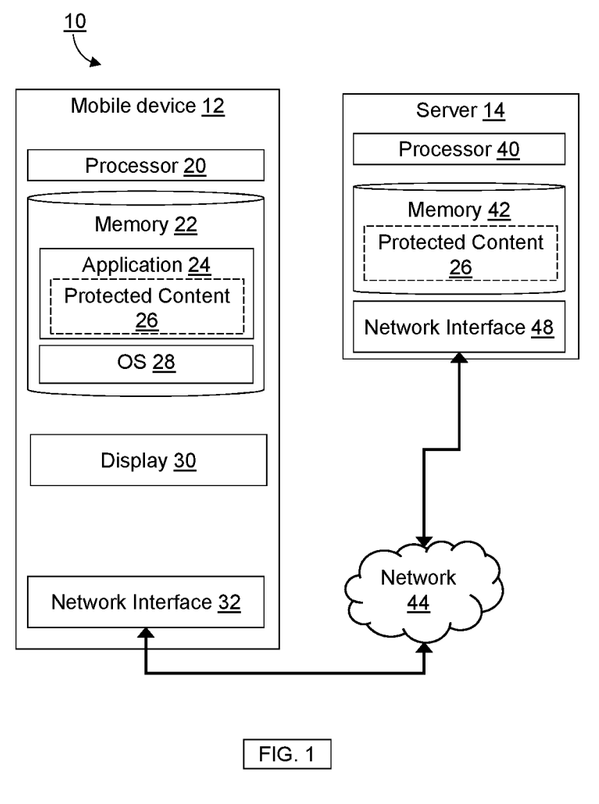
FIG. 1 is a block diagram representing a system for protecting electronic data accessed via a mobile device.

FIG. 1 depicts a system 10 for preventing electronic data from being compromised. In particular, the system prevents protected content from being copied and transferred from the mobile device. The system 10 includes a mobile device 12 and a server 14. The mobile device 12 includes a processor 20 and a memory 22 storing an application 24 and an operating system 28. The application 24 and operating system 28 are executable programs that are executed by the processor 20 of the mobile device 12. The application 24 generates content that is displayed on a display 30 of the mobile device. Some of the content displayed on the display 30 is the protected content.

The server 14 may be a computer system of one or more computers or servers. The mobile device 12 may comprise a cellular phone, smart phone, tablet, or any other portable electronic device capable of executing the application 24 and operating system 28. The mobile device 12 and server 14 each include at least a processor, a network interface, and non-transitory computer readable medium. The computer readable medium may include encoded thereon instructions for interfacing with the corresponding network interface and reading and writing data to the corresponding computer readable medium. The computer readable medium may also include computer programs (including the application 24) comprising instructions embodied thereon that are executed by the corresponding processor.

The mobile device 12 includes a display 30 configured to display protected content and non-protected content. The display 30 may comprise any suitable display for rendering content, such as a liquid crystal display (LCD), organic light-emitting diode (OLED), light-emitting diode (LED), electronic ink (E-ink), etc. The content displayed by the display 30 may be determined by the operating system 28 and/or applications executed by the processor 20 of the mobile device 12. For example, the application 24 may access protected content 26 stored on the server 14 and display the protected content on the display 30.

The processor 20 is configured to access the protected content 26. For example, as explained above, the processor 20 may execute the application 24 that accesses protected content 26 stored on the server 14. Alternatively, the protected content 26 may be stored on the non-transitory computer readable medium 22 of the mobile device 12 and accessed by the application 24.

As will be understood by one of ordinary skill in the art, the processor 20 may have various implementations. For example, the processor 20 may include any suitable device, such as a programmable circuit, integrated circuit, memory and I/O circuits, an application specific integrated circuit, microcontroller, complex programmable logic device, other programmable circuits, or the like. The processor 20 may also include a non-transitory computer readable medium, such as random access memory (RAM), a read-only memory (ROM), an erasable programmable read-only memory (EPROM or Flash memory), or any other suitable medium. The processor 20 may be communicatively coupled to the computer readable medium 22 and network interface 32 through a system bus, mother board, or using any other suitable structure known in the art.

The processor 20 is also configured to detect a security breach. The processor 20 detects the security breach by receiving a request 56 to record content currently displayed on the display 30. The request 56 to record content may comprise a user attempting to perform a screen capture of content currently being displayed on the display 30. The request 56 to perform a screen capture may be initiated by a user pressing a predefined combination of keys on an input 34 of the mobile device 12. For example, by simultaneously pushing a physical power button and a physical home screen button of the mobile device 12.

Upon receiving the request 56 to record content currently displayed, the processor 20 is configured to determine whether the content displayed on the display 30 when the request was received is protected content 26. That is, the processor 20 is configured to determine whether the displayed content was protected content or non-protected content. The processor 20 may determine that the content being displayed is protected content 26 if an application 24 (executed by the processor 20) generating the content being displayed is flagged as a protected application. That is, the application 24 may be flagged as a protected application such that any content being generated by the application 24 is assumed to be protected content 26. An application 24 may be flagged as a protected application if the process id, the name of the application, the location and name of the executable file, or any other suitable identifying characteristic of the application is stored in a database or list of protected applications stored on the non-transitory computer readable medium 22.

Alternatively or additionally, the processor 20 may notify the application 24 generating the content that a request 56 to record was received. The application 24 may then indicate whether the content being displayed was protected content 26 when the request 56 was received. In this way, an application 24 that displays both protected and non-protected content may determine the type of content that was being displayed when the request 56 was received. Upon determining the type of content displayed when the request 56 was received, the application 24 may notify the operating system 28 whether the content was protected content 26. For example, the application 24 may determine whether content currently displayed is protected content 26 based on an identifier associated with the content, the location the content was accessed from, or using any other tag or identifier capable of labeling content as protected content or non-protected content. The application 24 may also store a historical record of when protected content was displayed over a limited duration of time. For example, the application 24 may store a record of when protected content was displayed over the past 10 seconds, 2 seconds, 1 second, 200 milliseconds, or any other suitable duration of time.

If it is determined that the content being displayed when the request 56 was received is protected content 26, then the processor 20 determines that a security breach is detected. If a security breach is detected, the processor 20 is configured to optionally notify a third party that the security breach occurred and/or perform a remedial action. The mobile device 12 may notify a third party computer (e.g., the server 14) that a security breach occurred via the network interface 32. That is, the processor 20 may cause the network interface 32 to send a notification via a network 44 that the security breach occurred. As will be understood by one of ordinary skill in the art, the network 44 may comprise a private network, the internet, a wired network, a wireless network, or any other suitable network allowing the mobile device 12 and the third party to communicate with one another.

The mobile device 12 is not limited to notifying a single computer device that a security breach occurred, but may instead notify multiple devices (e.g., more than one server) that a security breach occurred. That is, the notification to the third party may include multiple notifications sent to different network locations. The parties notified when a breach occurred may be determined by the application 24 generating the protected content 26. Additionally, the parties contacted may be determined based upon the content being displayed when the security breach occurred. For example, there may be multiple tiers of protected content 26 (e.g., low, medium, and high). In this example, if a security breach occurred while low tier protected content 26 was displayed, then a first server 14a may be notified. If a security breach occurred while medium tier protected content 26 was displayed, then a second server 14b (in place of or in addition to the first server 14a) may be notified (or no notification may be sent). If a security breach occurred while high tier protected content 26 was displayed, then a third server 14c (in place of or in addition to the first server 14a and second server 14b) may be notified.

The notification that the security breach occurred may include information identifying at least one of the mobile device or a user of the mobile device. The identifying information may include any suitable information for identifying the mobile device 12 or a user of the mobile device, including a username used to sign into the mobile device 12 or used to access the protected content 26, a geo-location of the device 12, a device identifier, or an image captured by a camera of the mobile device after the request to record was received. The device identifier may comprise a MAC address, a serial number, or any information used to uniquely identify the mobile device 12. The notification that the security breach occurred may additionally or alternatively include a record of the content displayed on the display when the security breach occurred.

The processor 20 is also configured to perform a remedial action upon detecting a security breach. The remedial action may be performed before, after, or in place of notifying a third party as described previously. The remedial action may include deleting data stored on the mobile device, capturing an image of a user of the mobile device when the request to capture a screen shot was received, disabling the mobile device, and/or disabling login credentials used to access the protected content. The remedial action may be specified by the application 24 or may be initiated by the third party notified of the security breach. For example, upon receiving the notification of the security breach, the server 14 may instruct the processor 20 to perform a given remedial action. This instruction may be sent to the mobile device 12 via the network 44. In this example, the processor 20 performs the remedial action after receiving a request via the network interface 44 to perform the remedial action. In one example, a default remedial action may be initiated by the application 24 (e.g., disabling login credentials) and instruction to perform an additional or alternative remedial action (e.g., disabling the mobile device) may be sent by the third party.

In one embodiment, the third party computer receiving the notification of the security breach includes a communication interface configured to communicate with the network interface of the mobile device and receive the notification from the mobile device. The third party computer also includes a processor configured to receive the notification from the communication interface. In this embodiment, the notification includes information regarding the protected content displayed on the display when the request was received and a user of the mobile device. The processor determines the nature of the protected content displayed on the display when the request was received. For example, the processor may determine the nature of the protected content displayed by comparing the displayed content to the content stored on the third party computer. Based on the nature of the protected content and the user of the mobile device, the processor determines a remedial action to perform. The processor may determine the remedial action by using a lookup table. Finally, the third party computer sends an indication of the remedial action to perform to the mobile device 12.

Figure 2:
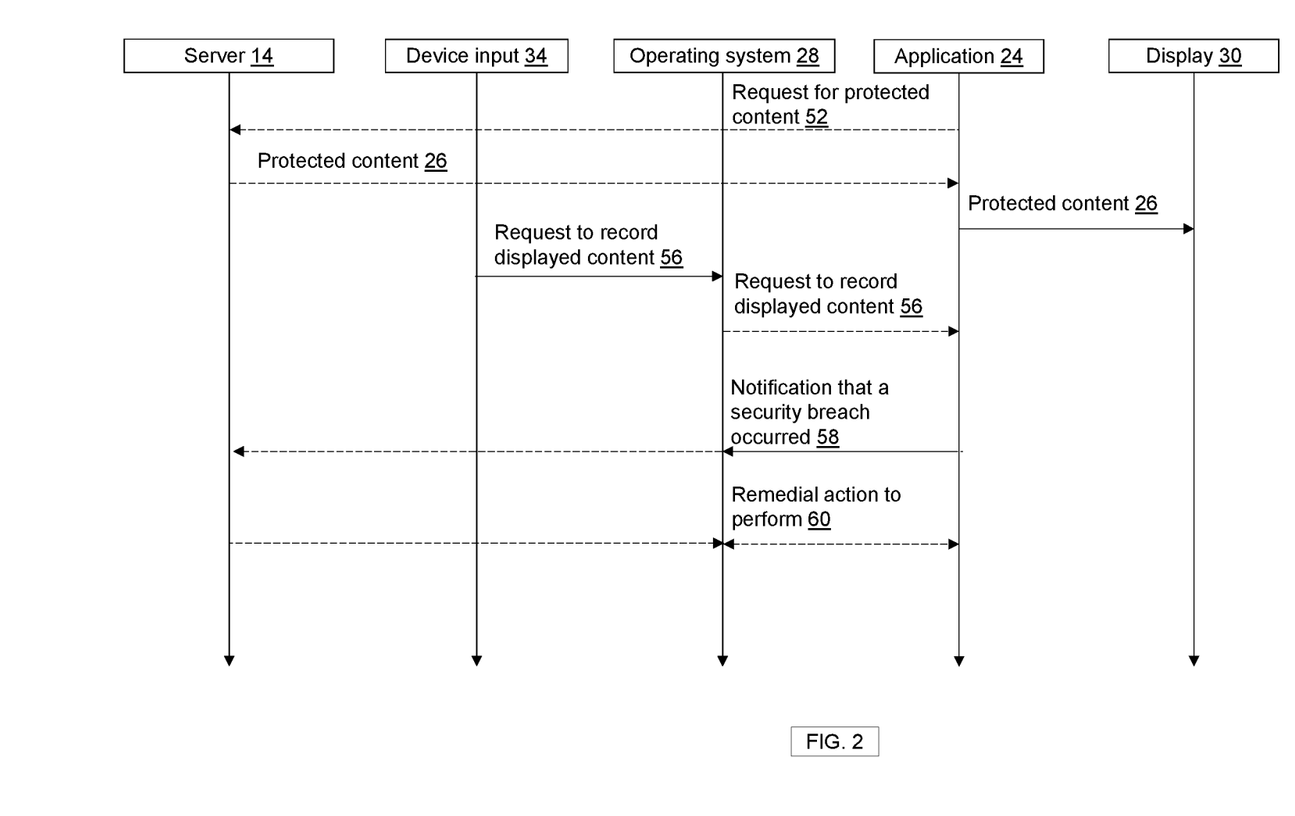
FIG. 2 is a ladder diagram illustrating communication between the operating system, application, display, and server within the system of FIG. 1.

FIG. 2 depicts communication of data within the mobile device 12 and between the mobile device 12 and the server 14. In the figure, the application 24 running on the mobile device 12, optionally sends a request for protected content 52 to the server 14. For example, if a user requests to view their bank statement or other financial data, a request for protected content 52 may be sent to the server 14. The server 14 receives the request 52 and, assuming that all required security procedures are satisfied (e.g., the user authenticates with the server), protected content 26 is sent to the application 24. Alternatively, the protected content 52 may be stored within the memory 22 of the mobile device 12. In this example, the application 24 may access the protected content 26 directly from the memory 22 without sending a request for protected content 52 to the server 14.

Upon receiving the protected content 54, the application 24 causes the display 30 to display the protected content 26. The mobile device 12 also includes a device input 34. If the operating system 28 receives a request to record displayed content 56 from the device input 34, then the request 56 may be passed to the application 24. Alternatively, as opposed to passing the request to record 56 to the application 24, the operating system 28 may request information regarding the content displayed at the time that the request to record content 56 was received. In either case, the application 24 may notify the operating system 28 that a security breach occurred 28 if the content being displayed when the request to record 56 was received was protected content. The application 24 may alternatively or additionally notify the server 14 if a security breach 28 occurred.

After it is determined that a security breach 28 occurred, instructions to perform a remedial action 60 may be received. The instructions may be received by at least one of the server 14, the operating system 28, or the application 24. The instructions to perform the remedial action 60 may be provided by at least one of the server 14, the operating system 28, or the application 24. For example, the application 24 may contain a list of default remedial actions to perform until further instructions are received from the operating system 28 or the server 14. For example, the application 24 may be configured to only display non-protected content until further instructions are received from the server 14. The server 14 may then send instructions to perform a remedial action, such as locking down the application 24 so that no content is accessible through the application 24.

Figure 3:
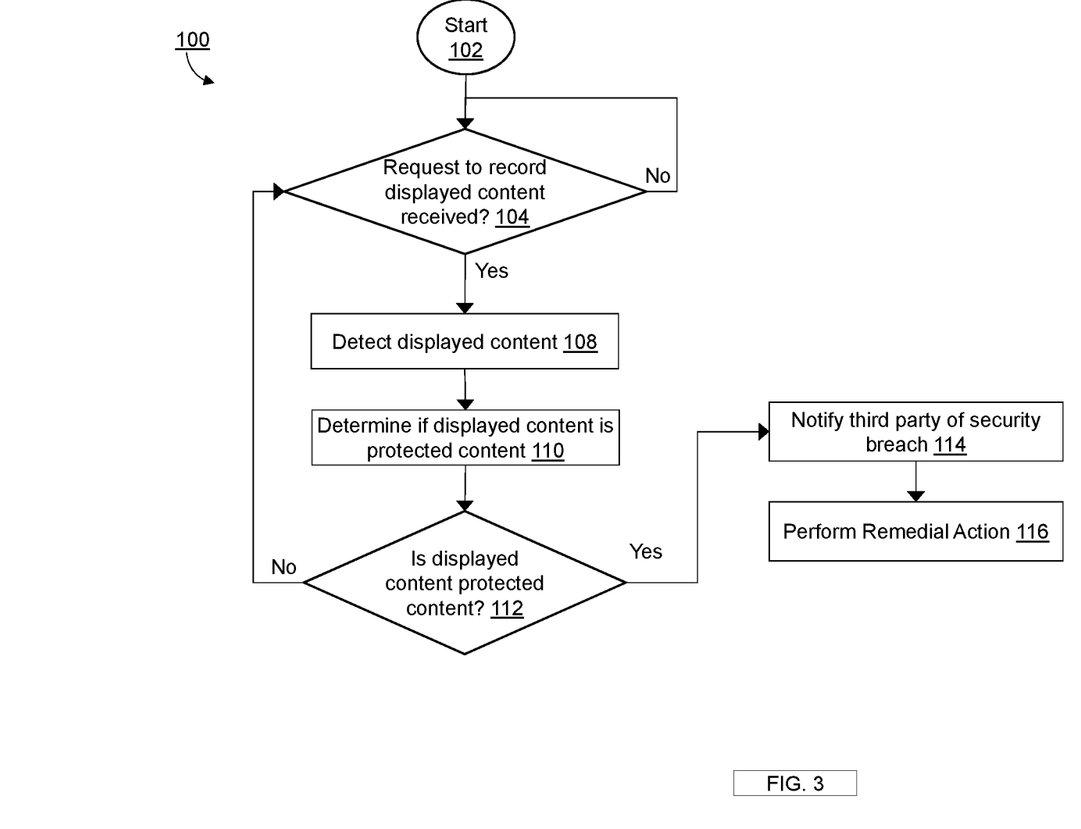
FIG. 3 is a flow diagram representing a method for protecting electronic data accessed via a mobile device.

Turning to FIG. 3, a block diagram is shown depicting a method 100 for securing data by detecting a request to record content. Following the start of the method 100 in process block 102, the method 100 determines in decision block 104 whether a request to record content currently displayed on a display of the mobile device was received. If a request was not received, then the method returns back to decision block 104. If a request was received, then process block 108 is performed.

In process block 108, the content displayed on the display when the request to record currently displayed content was received is detected. In process block 110, it is determined whether the content displayed on the display when the request was received is protected content or non-protected content. As described above, the type of content displayed may be determined by the application 24 generating the content being displayed. For example, if the application 24 is identified as a protected application, then any content displayed by the application 24 is determined to be protected content. Alternatively, the application 24 may be polled to determine whether the content being displayed when the request was received is protected content. In decision block 112, if the displayed content is non-protected content, then the method returns to decision block 104. If the displayed content is protected content, then the method 100 moves to process block 114.

In process block 114, a third party is notified that a security breach has occurred. As described above, the notification that the security breach occurred may include information identifying at least one of the mobile device or a user of the mobile device. The notification that a security breach occurred may alternatively or additionally include a record of the content displayed on the display when the request was received. In process block 116, a remedial action is performed. As described above the remedial action may be performed only after receiving a request to perform the remedial action.

The method 100 may run as a background process on the mobile device 12. The method 100 may be included as a part of the operating system 28, the application 24, or as a standalone application.

Data (e.g., the request for protected content 52, the protected content 26, notification that a security breach occurred 58, and remedial action 60) may be transferred over a network 44 connecting the mobile device 12 and the server 14. The network 44 may be at least one of a TCP/IP network or a system bus. For example, when a user attempts to transfer data via a USB port, the network 44 would comprise the system bus connecting the USB port and the memory 22 of the mobile device 12.

As will be understood by one of ordinary skill in the art, the network 44 is not limited to a single LAN, but may comprise any suitable network of devices. For example, the predefined areas 80 may comprise a collection of LANs, a Bluetooth Network, the Internet, etc.

As will be understood by one of ordinary skill in the art, the transmission of data (e.g., the request for protected content 52, the protected content 26, notification that a security breach occurred 58, and remedial action 60) may be transmitted using any suitable protocol (e.g., TCP/IP, Bluetooth, SMTP, HTTP, SSL, PPP, IMAP, or any other suitable network protocol).

The processor of the mobile device 12 may identify the location of the corresponding device using a global positioning system (GPS) device, cellular triangulation, WI-FI positioning, or any other suitable technique or device to determine location.

As will be understood by one of ordinary skill in the art, the processors of the mobile device 12 and server 14 may have various implementations. For example, each of the processors may include any suitable device, such as a programmable circuit, integrated circuit, memory and I/O circuits, an application specific integrated circuit, microcontroller, complex programmable logic device, other programmable circuits, or the like. Each of the processors may also include a non-transitory computer readable medium, such as random access memory (RAM), a read-only memory (ROM), an erasable programmable read-only memory (EPROM or Flash memory), or any other suitable medium. Instructions for performing the methods described above may be stored in the non-transitory computer readable medium and executed by the respective processor identified in the description of the method. Each of the processors may be communicatively coupled to the respective computer readable medium and network interface through a system bus, mother board, or using any other suitable structure known in the art.

The network interfaces of the mobile device 12, server 14, and predetermined server 14 may each be communicatively coupled to one or more other host devices 12 and receiving devices 14 via a network 44. The network 44 may be an open network, such as the Internet, a private network, such as a virtual private network, or any other suitable network. Each of the network interface may be configured to transmit and/or receive data.

As will be understood by one of ordinary skill in the art, each of the network interfaces may comprise a wireless network adaptor, an Ethernet network card, or any suitable device for performing network based communication between devices. Each of the network interface may be communicatively coupled to the respective computer readable medium such that each network interface is able to send data stored on the respective computer readable medium across the network 44 and store received data on the respective computer readable medium. Each of the network interface may also be communicatively coupled to the respective processor such that the processor is able to control operation of the network interface. The respective network interfaces, computer readable medium, and processors may be communicatively coupled through a system bus, mother board, or using any other suitable manner as will be understood by one of ordinary skill in the art.

Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A mobile device configured to provide notification of an electronic data security breach, the mobile device comprising:
   a non-transitory computer readable memory including a list of protected applications;
   a network interface configured to receive protected content from a third party computer;
   a display configured to display the protected content and non-protected content;
   and a processor electronically connected to the non-transitory computer readable memory, the network interface, and the display, the processor configured to:
   access the protected content and the non-protected content;
   receive a request to record content currently displayed on the display, wherein the content being displayed is generated by an application; detect the content displayed on the display when the request to record currently displayed content was received;
   identify the application generating the content being displayed when the request to record the content was received by reviewing the list of the protected applications;
   notify the identified application that the request to record the content was received, the identified application displaying both the protected content and the non-protected content;
   poll the identified application to determine if the protected content is displayed; when the identified application was displaying the protected content when the request to record the currently displayed content was received, receive from the identified application an indication that the content being displayed was protected content;
   when the received indication identifies the content as the protected content:
   notify the third party computer via the network interface that the security breach occurred, said notification including information identifying the mobile device; and
   perform a remedial action.

2. The mobile device of claim 1, wherein the information includes a geo-location of the mobile device.

3. The mobile device of claim 1, wherein the information includes an image captured by a camera on the mobile device.

4. The mobile device of claim 1, wherein the notification to the third party includes multiple notifications sent to different network locations.

5. The mobile device of claim 1, wherein the remedial action comprises disabling the mobile device.

6. The mobile device of claim 1, wherein the remedial action comprises disabling login credentials used to access the protected content.

7. The mobile device of claim 1, wherein the remedial action comprises deleting data stored on the mobile device.

8. A system configured to provide notification of an electronic data security breach on a mobile device, the system including:
the mobile device comprising:
a non-transitory computer readable memory, a network interface, and a display each electronically connected to a processor;
wherein the processor is configured to:
access protected content and non-protected content, wherein the protected content originated from a third party computer;
receive a request to record content currently displayed on the display, wherein the content being displayed is generated by an application;
detect the content displayed on the display when the request to record currently displayed content was received;
identify the application generating the content being displayed when the request to record the content was received by reviewing a list of protected applications;
notify the identified application that the request to record the content was received, the identified application displaying both the protected content and the non-protected content;
poll the identified application to determine if the protected content is displayed;
when the identified application was displaying the protected content when the request to record the currently displayed content was received, receive from the identified application an indication that the content being displayed was the protected content;
when the received indication identifies the content as the protected content, send the notification to the third party computer via the network interface, wherein the notification indicates that the security breach occurred and mobile device information identifying the mobile device; and
the third party computer comprising:
a communication interface configured to communicate with the network interface of the mobile device and receive the notification from the mobile device;
a computer processor configured to: receive the notification from the communication interface, wherein the notification includes protected content information regarding the protected content displayed on the display when the request was received and a user of the mobile device;
determine characteristics of the protected content displayed on the display when the request was received;
based on the characteristics of the protected content and the user of the mobile device, determine a remedial action to perform;
send a remedial indication of the remedial action to perform to the mobile device;
wherein the processor of the mobile device is further configured to perform the remedial action indicated by the third party computer.

9. The system of claim 8, wherein the mobile device information includes a geo-location of the mobile device.

10. The system of claim 8, wherein the mobile device information includes an image captured by a camera on the mobile device.

11. The system of claim 8, wherein the notification to the third party includes multiple notifications sent to different network locations including the third party computer.

12. The system of claim 8, wherein the remedial action comprises disabling the mobile device.

13. The system of claim 8, wherein the remedial action comprises disabling login credentials used to access the protected content.

14. The system of claim 8, wherein the remedial action comprises deleting data stored on the mobile device.

* * * * *